April 4, 1944.  W. P. CLAUS ET AL  2,345,729
WHEEL RECEIVING CARRIAGE
Original Filed June 16, 1939
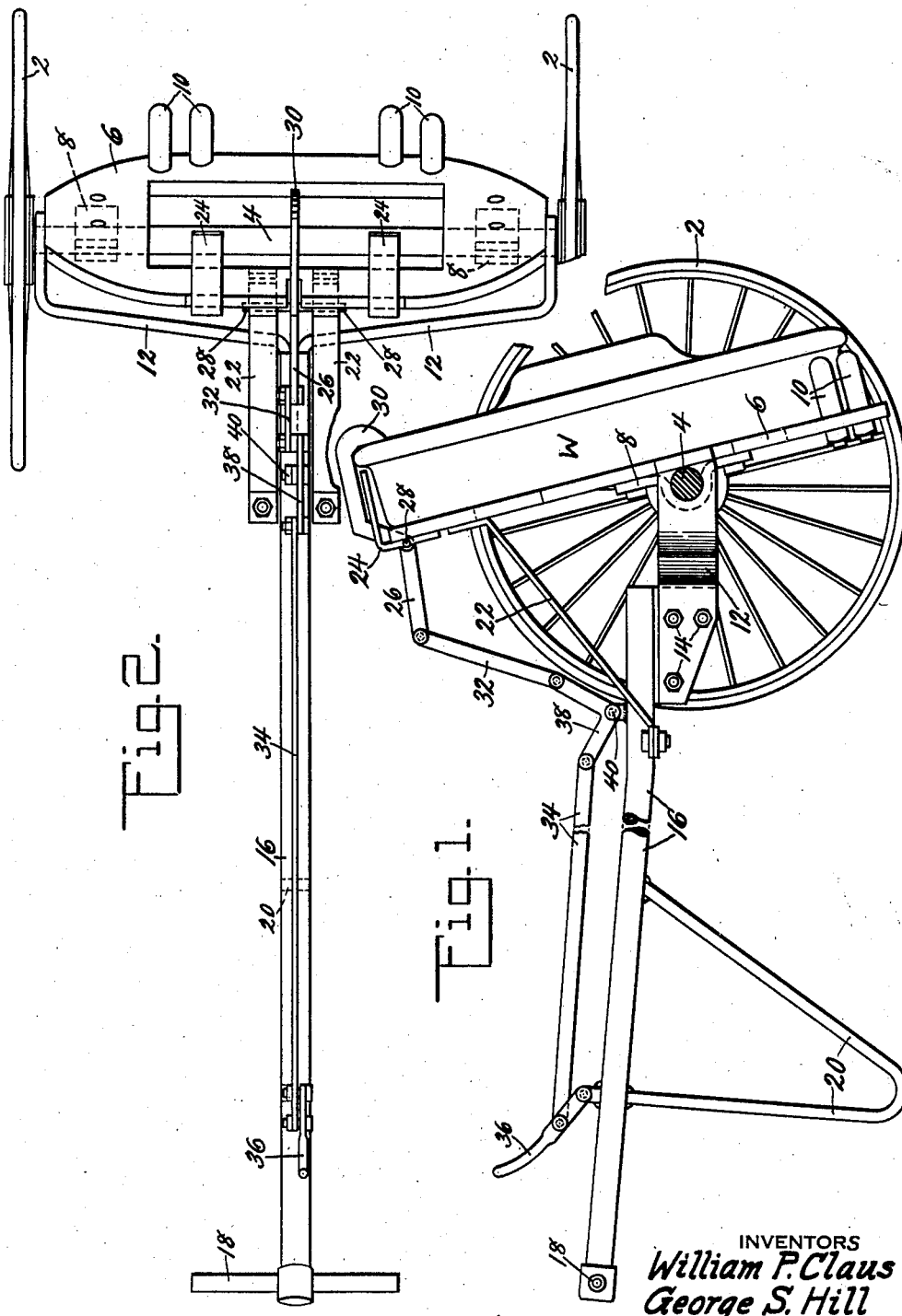
INVENTORS
William P. Claus
George S. Hill
BY Donald H. Rich ATTORNEY Patented Apr. 4, 1944

2,345,729

UNITED STATES PATENT OFFICE 2,345,729

WHEEL RECEIVING CARRIAGE

William P. Claus and George S. Hill, Berwick, Pa., assignors to American Car and Foundry Company, New York, N. Y., a corporation of New Jersey Original application June 16, 1939, Serial No. 279,452, now Patent No. 2,293,194, dated August 18, 1942. Divided and this application June 24, 1942, Serial No. 448,267

4 Claims. (Cl. 214—65.4)

This invention relates generally to wheel receiving or carry-off carriages and in particular to such carriages adapted for use in foundries or at any point where it is necessary to handle heavy railway car or similar wheels, the present application being a division of our co-pending application Serial No. 279,452, filed June 16, 1939, now Patent No. 2,293,194 granted August 18, 1942.

The present practice of handling wheels of this type, as described in the above referred to application, requires heavy and dangerous manual work on the part of a workman often resulting in serious injury, the wheels sometimes weighing as much as 900 pounds each and handled, as they come from the soaking pits, at temperatures ranging as high as 600 degrees. It is an object of the present invention, therefore, to provide a wheel receiving carrieg for easily and safely handling heavy wheels at high temperatures without the necessity of a workman coming near the wheel.

A further object of the invention is the provision of a wheel receiving or carry-off carriage adapted to be used with an automatically operating tilt table, as shown and described in the previously referred to application, and by which the heavy wheels may be easily and safely removed from the tilt table and transported to the desired location.

These and other objects of the invention will be apparent to persons skilled in the art from a study of the following description and accompanying drawing in which:

Figure 1 is a side elevational view, partly in section, of the wheel receiving or carry-off carriage with the wheel in position thereon, and Fig. 2 is a plan view of the wheel receiving carriage.

Referring now more particularly to the drawing, it will be noted that the wheel receiving or carry-off carriage is formed by a pair of wheels 2 joined together by an axle 4. A wheel receiving table 6 is secured to the axle by means of U-shaped clips or other means 8, the wheel receiving table having the central portion thereof cut out in order to lighten the same, as clearly shown in the drawing. Secured to the lower edge of the wheel receiving table, at opposite sides thereof, are pairs of outstanding lugs 10 adapted to engage the tread of the wheel W and support the same, the lugs being spaced sufficiently from the center of the table to prevent any rolling tendency of the wheel thereon. In order to control the movements and angular position of the receiving table, bars 12 are secured to the side edges of the table adjacent the axle and are themselves connected together by means of bolts or other securing devices 14 extending through a plate or similar structure to which one end of a tubular handle 16 is secured. The opposite end of the handle is provided with hand grips 18, while intermediate its ends the handle is provided with a V-shaped supporting leg 20 adapted to support the handle when not being used in movement of the carriage. The handle is additionally connected to the receiving table by means of bracing ties 22, thus stiffening the table and preventing any distortion between the table and the handle 16.

At substantially spaced points on the upper edge of the wheel receiving table are welded or otherwise secured projecting latch releasing members 24 so spaced as to engage the wheel retaining latches carried by the tilt table, whereby to release the wheel from the tilt table for transfer to the wheel carry-off carriage, as clearly shown and described in the before mentioned application. Intermediate the latch releasing members 24 is a latch 26 pivotally connected as at 28 to the wheel receiving table and formed to provide a hook portion 30 adapted to engage over the flange of the wheel after the latter has been positioned on the receiving table of the carry-off carriage. This latch 26 is operated by means of bars 32 and 34 which are connected at one end to the latch and to an operating lever 36, respectively, while the other ends of the bars are connected together by means of a bell crank 38 pivotally mounted, as indicated at 40, upon the inner end of the handle 16. The angular relation of the operating lever 36 is such that, together with the weight of the bar 34, the latch 26 may be automatically held in either the latched or the released position.

The wheel receiving or carry-off carriage just described is operated as follows, and assuming the tilt table to be in its horizontal position with the wheel held in position thereon, as set forth in the above referred to application: An operator now pushes the carry-off carriage toward the tilt table in such a way that one of the carriage wheels 2 engages and acts to release the locking mechanism on the tilt table, permitting the latter, with the wheel mounted thereon, to promptly assume a substantially vertical position, where it is held in a manner as shown and described in the said application Serial No. 279,452. The wheel is now in position for removal from the tilt table to the receiving carriage, continued movement of the latter toward the table causing the releasing members 24 to disengage the latches retaining the wheel on the tilt table, thus permitting the upper edge of the wheel to tilt against the receiving table 6 of the carry-off carriage. Before this can occur, however, the outstanding lugs 10 have engaged beneath the tread of the wheel and are in position to receive the weight thereof. The operator now throws the lever 36 causing the latch 26 to engage over the flange of the wheel and then, by bearing down slightly on the handle 16, the wheel is lifted free of the retaining lugs on the tilt table and the carriage with the wheel securely supported thereon may now be withdrawn. The wheel may now be moved to any desired location and is released from the carry-off carriage by the operator merely raising the handle 16 until the flange of the wheel rests on the floor, after which the operating lever 36 is thrown forwardly to disengage latch 26, leaving the wheel standing in a slightly tilted position against any convenient structure.

From the foregoing description it will be seen that a device has been provided which makes it unnecessary for a workman to come near the heavy hot car wheel, thus avoiding the danger of injury and permitting easy and safe handling of the wheels, both in transferring them from a tilt table to the carry-off carriage and in moving them to the desired location. While the invention has been described more or less in detail, it is believed that various modifications thereof will occur to persons skilled in the art and all such modifications are contemplated as will fall within the scope of the appended claims.

What is claimed is:

1. A wheel receiving carriage comprising in combination, carriage wheels supporting an axle, a table secured adjacent the central portion thereof to said axle, spaced lugs secured to said table and adapted to support and center the wheel on said table, and an operating handle secured to said table to control the angular position thereof.

2. A wheel receiving carriage comprising in combination, carriage wheels supporting an axle, a table secured adjacent the central portion thereof to said axle, spaced lugs secured to said table and adapted to support and center the wheel on said table in either a vertical or an inclined position, an operating handle secured to said table to control the angular position thereof, and a latch carried by said table adjacent the upper portion thereof and engageable with the wheel to prevent accidental removal thereof from the table.

3. A wheel receiving carriage comprising in combination, carriage wheels supporting an axle, a table mounted on said axle and rotatable therewith, spaced lugs secured to said table adjacent the lower edge thereof and adapted to support and center the wheel on said table, latch means rotatably secured to the upper edge portion of said table and engageable with the wheel to prevent accidental removal thereof from the table, and an operating handle secured to said table for controlling the angular position of the table, said latch means being operable from the handle to permit removal of the wheel.

4. A receiving carriage for a hot car wheel comprising in combination, carriage wheels supporting an axle, a table mounted on said axle, spaced lugs secured to said table adjacent the lower edge thereof, said lugs engaging the tread portion of the hot car wheel to support and center the same on said table, latch means rotatably secured to said table adjacent the upper portion thereof and engageable with the flange of the hot car wheel to prevent accidental removal thereof from the table, an operating handle secured to said table for controlling the angular position of the table, and means for controlling said latch means to permit removal of the hot car wheel from the table.

WILLIAM P. CLAUS.
GEORGE S. HILL.